United States Patent
Chen

(10) Patent No.: US 8,813,598 B2
(45) Date of Patent: Aug. 26, 2014

(54) BALL SCREW

(75) Inventor: Yan-Yu Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 183 days.

(21) Appl. No.: 13/586,859

(22) Filed: Aug. 15, 2012

(65) Prior Publication Data

US 2012/0304793 A1    Dec. 6, 2012

Related U.S. Application Data

(63) Continuation-in-part of application No. 12/624,446, filed on Nov. 24, 2009.

(51) Int. Cl.
*F16H 1/24* (2006.01)
*F16H 55/02* (2006.01)

(52) U.S. Cl.
USPC .................................... 74/424.88; 74/424.86

(58) Field of Classification Search
CPC ............ F16H 25/2214; F16H 25/2238; F16H 25/2204; F16H 57/0497; F16H 25/2233; F16H 25/20
USPC .............................. 74/424.82, 424.86, 424.88
See application file for complete search history.

(56) References Cited

U.S. PATENT DOCUMENTS

| | | | |
|---|---|---|---|
| 6,247,646 B1 * | 6/2001 | Iwaguchi et al. | 235/462.04 |
| 6,484,599 B2 * | 11/2002 | Blaurock | 74/424.75 |
| 6,575,632 B2 * | 6/2003 | Kawaguchi et al. | 384/51 |
| 7,625,120 B2 * | 12/2009 | Pan et al. | 384/51 |
| 2002/0026844 A1 * | 3/2002 | Fujita | 74/424.86 |
| 2006/0169079 A1 * | 8/2006 | Lee et al. | 74/424.82 |
| 2007/0028712 A1 * | 2/2007 | Teramachi et al. | 74/424.82 |

FOREIGN PATENT DOCUMENTS

JP    5-27408 B1    4/1993

* cited by examiner

*Primary Examiner* — Justin Krause
(74) *Attorney, Agent, or Firm* — Banger Shia

(57) ABSTRACT

A ball screw has a chain received in a circulation path of the ball screw, and the chain comprises a plurality of partition portions and a connecting portion for connecting the partition portions, a plurality of rolling elements are retained in the chain in such a manner that between each two neighboring partition portions is arranged a rolling element, each of the rolling elements is partially in contact with the return passage of each of the return assemblies to define receiving spaces in the return passage for accommodation of the connecting portion, so that the chain can be moved more smoothly in the return passage, and the manufacturing cost of the return assembly is reduced.

5 Claims, 5 Drawing Sheets

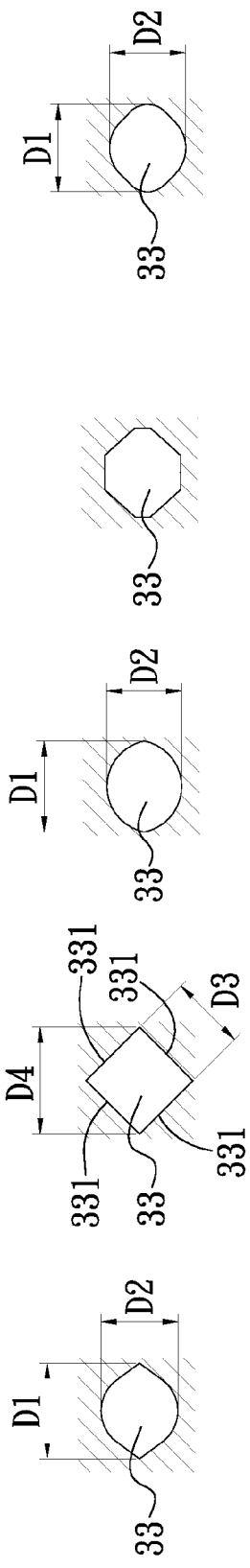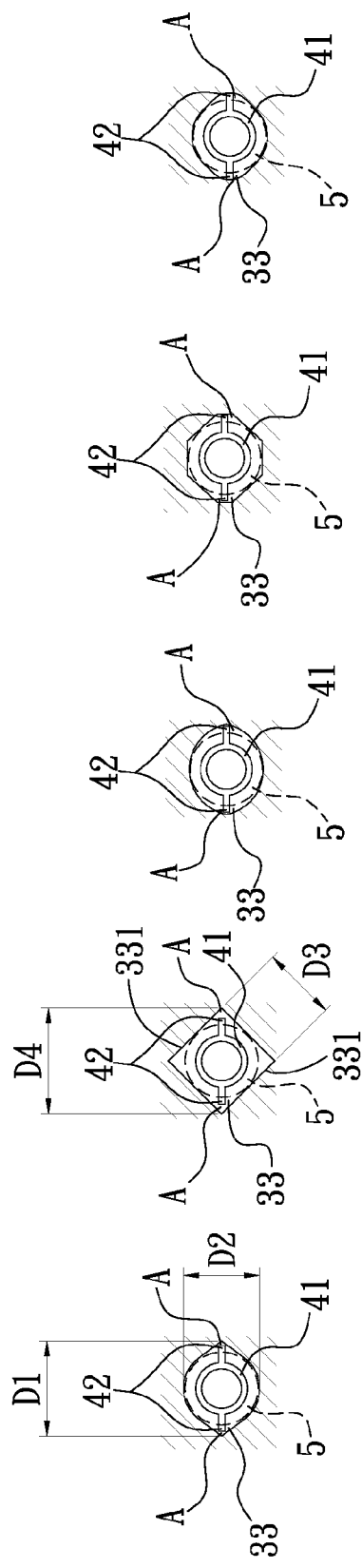

BALL SCREW

This application is a continuation in part of U.S. patent application Ser. No. 12/624,446, which claims the benefit of the earlier filing date of Nov. 24, 2009.

BACKGROUND OF THE INVENTION

1. Field of the Invention

The present invention relates to a linear motion transmission device, and more particularly to a ball screw.

2. Description of the Prior Art

A conventional ball screw disclosed in JP Pat. No. 5-27408 comprises a screw, a nut, return assemblies, a chain and a plurality of rolling elements. The screw is defined with a helical groove, and the nut is inserted on the screw and defined with a helical groove corresponding to the helical groove of the screw. The return assemblies are disposed on the outer periphery of the nut and each provided with a return path for connecting with the helical grooves to form a circulation path. The chain is provided for holding the rolling elements and disposed in the circulation path. The return path of each return assembly is defined with a groove for passage of a connecting portion of the chain. This conventional ball screw has the following disadvantages that need to be improved:

1. As shown in FIG. 6, the chain 6 must twist while moving in the return passage of the return assembly in order to successfully pass therethrough, and the connecting portion 61 will deform along with the twisting motion of the chain 6, which results in an interference of the connecting portion 61 with the groove 7, and the position at which the interference is most likely to occur is indicated by R since the groove 7 at the position R extends inwards with respect to the rolling elements 8 and is likely to cause interference with the connecting portion 61.

2. Since the connecting portion 61 is received in the groove 7, the groove 7 requires high machining precision, and the machining will be more difficult especially when the return assemblies are small.

3. The return passage for passage of the chain consists of a passage which is circular in cross section for passage of the rolling elements and a groove which is rectangular in cross section for passage of the connecting portion 61 of the chain 6. Namely, the return passage comprises two different geometries, and the circular passage and the rectangular groove that form the return passage are in communication with each other, so that the cross section of the return passage is not a complete circular or rectangular shape. Hence, forming such a two-geometrical return passage is relatively difficult and complicated as compared to forming a single-geometrical return passage, and this two-geometrical passage is not suitable for mass production.

The present invention has arisen to mitigate and/or obviate the afore-described disadvantages.

SUMMARY OF THE INVENTION

The primary object of the present invention is to provide a ball screw, wherein the return passage of the return assembly allows the rolling elements to move smoothly, and the return assembly can be easily made.

A ball screw in accordance with the present invention comprises:

a screw is defined on its outer periphery with a helical groove;

a nut is inserted on the screw and defined with a helical groove which cooperates with the helical groove to form a load path;

at least one return assembly is disposed on the nut and defined with a return passage which is connected to the load path to form a circulation path;

a chain is received in the circulation path and comprises a plurality of partition portions and a connecting portion for connecting the partition portions, a plurality of rolling elements are retained in the chain in such a manner that between each two neighboring partition portions is arranged a rolling element, each of the rolling elements is partially in contact with the return passage of each of the return assemblies to define receiving spaces in the return passage for accommodation of the connecting portion. In other words, the shape of the cross section of the return passage is formed by a plurality of line segments which protrude outwards with respect to the rolling elements.

For a clear explanation of the present invention, here follows are the improvements and advantages of the invention over the conventional art:

1. The return passage of the return assembly of the present invention utilizes the rolling elements to divide the return passage into two receiving spaces which can be used to receive the connecting portion of the chain without having to form a groove for the connecting portion of the chain. Hence, when the chain twists during movement, the receiving spaces are large enough to allow the deformation of the connecting portion of the chain without causing interference with the connecting portion, and thus allowing the chain to move more smoothly.

2. Since the receiving spaces for the connecting portion of the chain is defined by the rolling elements in contact with the return passage, it doesn't need to form a special groove for holding the connecting portion, which makes it easy to manufacture a small sized return assembly, and as a result, manufacturing cost is relatively reduced.

3. The conventional return passage is formed with the groove for passage of the connecting portion of the chain, and the groove is more likely to cause interference with the chain. However, the present invention is not provided with such a groove, so the plurality of line segments which form the cross section of the return passage protrude outwards with respect to the rolling elements and won't cause any interference with the chain, allowing the chain to move more smoothly.

BRIEF DESCRIPTION OF THE DRAWINGS

FIG. 4A is a cross sectional view showing a first embodiment of the shape of the cross section of the return passage, which is taken along the line A-A of FIG. 3A;

FIG. 4B is a cross sectional view showing a second embodiment of the shape of the cross section of the return passage, which is taken along the line A-A of FIG. 3A;

FIG. 4C is a cross sectional view showing a third embodiment of the shape of the cross section of the return passage, which is taken along the line A-A of FIG. 3A;

FIG. 4D is a cross sectional view showing a fourth embodiment of the shape of the cross section of the return passage, which is taken along the line A-A of FIG. 3A;

FIG. 4E is a cross sectional view showing a fifth embodiment of the shape of the cross section of the return passage, which is taken along the line A-A of FIG. 3A;

FIG. 5A shows that in the return passage of FIG. 4A is disposed a chain and rolling elements;

FIG. 5B shows that in the return passage of FIG. 4B is disposed a chain and rolling elements;

FIG. 5C shows that in the return passage of FIG. 4C is disposed a chain and rolling elements;

FIG. 5D shows that in the return passage of FIG. 4D is disposed a chain and rolling elements;

FIG. 5E shows that in the return passage of FIG. 4E is disposed a chain and rolling elements;

DETAILED DESCRIPTION OF THE PREFERRED EMBODIMENTS

Figure 1:
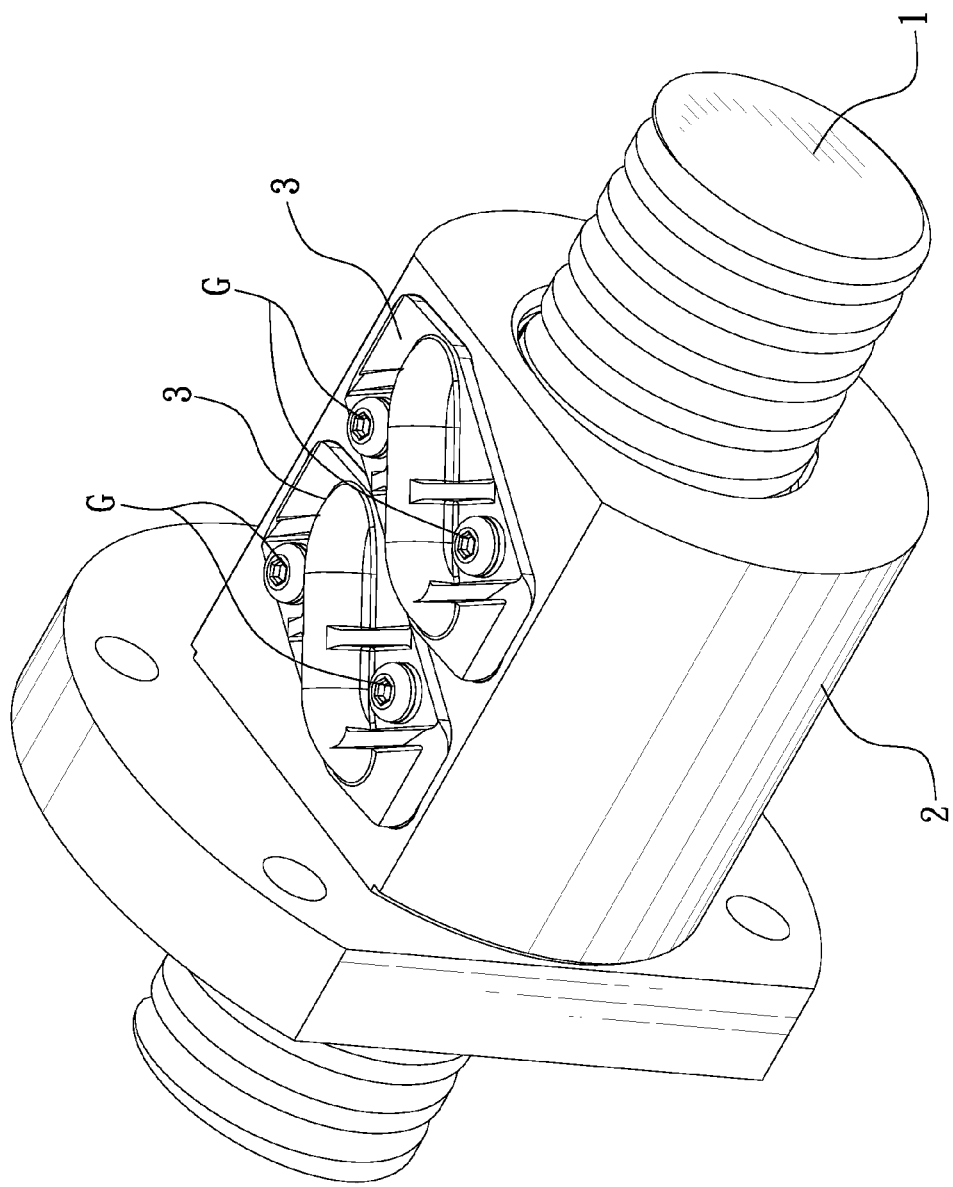
FIG. 1 is a perspective view of a ball screw in accordance with the present invention.
Figure 2:
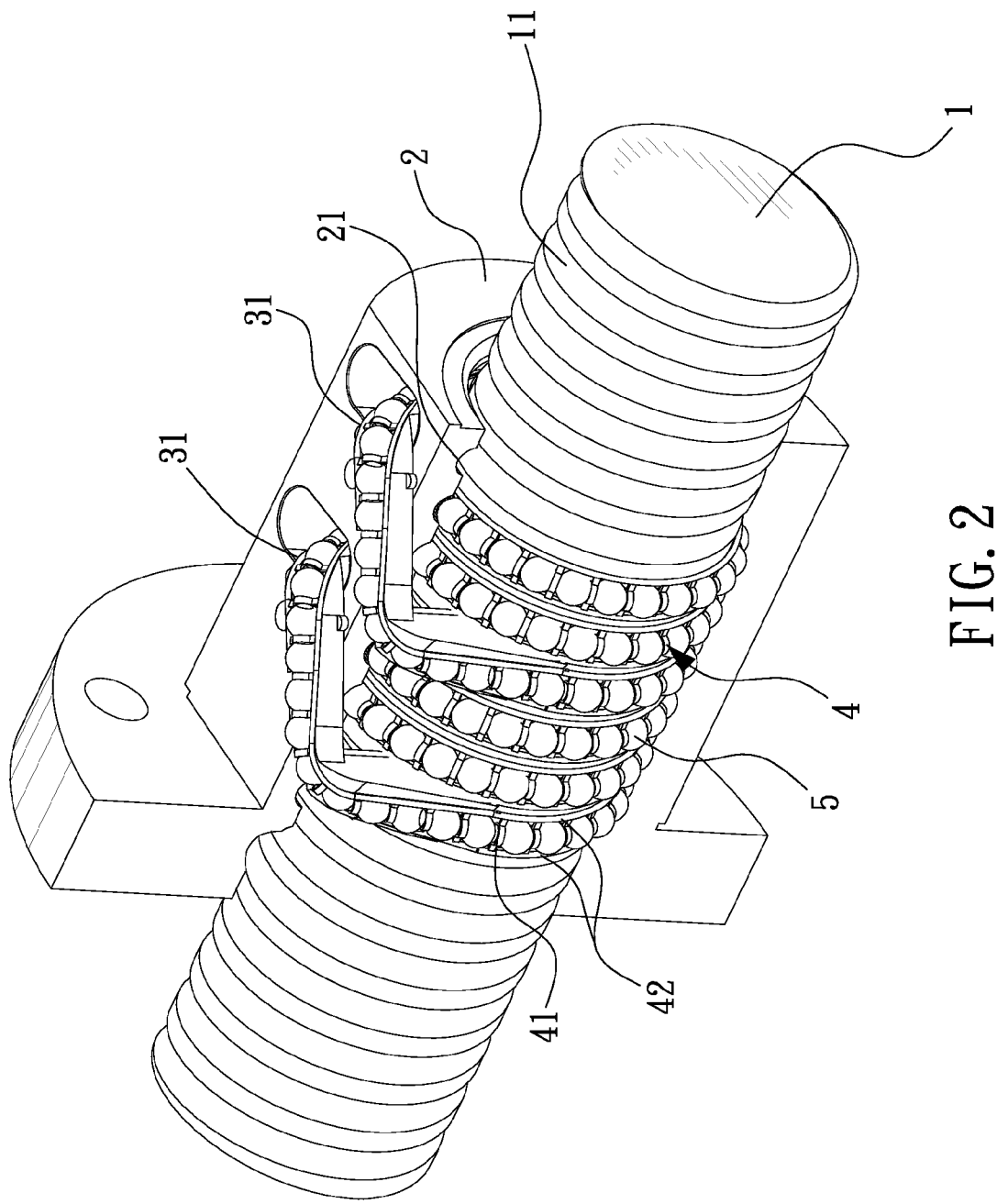
FIG. 2 is a cross sectional view of FIG. 1.

The present invention will be clearer from the following description when viewed together with the accompanying drawings, which show, for purpose of illustrations only, the preferred embodiment in accordance with the present invention.

Referring to FIGS. 1-5, a ball screw in accordance with the present invention comprises: a screw 1, a nut 2, at least one return assembly 3 (and there are two return assemblies 3 in this embodiment), a chain 4 and a plurality of rolling elements 5.

The screw 1 is defined on its outer periphery with a helical groove 11.

The nut 2 is inserted on the screw 1 and defined with a helical groove 21 which cooperates with the helical groove 11 to form a load path.

Each of the return assemblies 3 is disposed on the nut 2 and defined with a return passage 33 which is connected to the load path to form a circulation path.

The chain 4 is received in the circulation path and comprises a plurality of partition portions 41 and a connecting portion 42 for connecting the partition portions 41. The rolling elements 5 are retained in the chain 4 in such a manner that between each two neighboring partition portions 41 is arranged a rolling element 5. Each of the rolling elements 5 is partially in contact with the return passage 33 of each of the return assemblies 3 to define two receiving spaces A in the return passage 33 for accommodation of the connecting portion 42, as shown in FIGS. 5A, B, C, D and E).

Referring then to FIGS. 4 A, B, C, D and E, the return passage 33 of each of the return assemblies 3 can be rectangular, multiple arc-shaped, polygonal or elliptical-shaped.

As shown in FIGS. 4A, C, E and FIGS. 5A, C and E, the cross section of the return passage 33 is a closed and complete elliptical shape and includes a first axis D1 and a second axis D2 which is shorter than the first axis D1. A central portion of the return passage 33 is provided for passage of the rolling elements 5, the outer diameter of the rolling elements 5 is equal to the length of the second axis D2, and the length of the first axis D1 is larger than the outer diameter of the rolling elements 5, so that two semilunar receiving spaces A will be formed between the inner surface of the return passage 33 at both ends of the first axis D1 and each of the rolling elements 5, and the connecting portion 42 of the chain 4 is movably accommodated in the receiving spaces A.

Referring then to FIGS. 4B and 5B, the cross section of the return passage 33 is a closed and complete rectangular shape and includes four edges 331. A width between two opposed edges 331 of the cross section of the return passage 33 is D3, and a diagonal distance of the rectangular cross section of the return passage 33 is D4. A central portion of the return passage 33 is provided for passage of the rolling elements 5, the outer diameter of the rolling elements 5 is equal to the width D3 between two opposed edges 331 of the cross section of the return passage 33, and the diagonal distance D4 of the rectangular cross section of the return passage 33 is larger than the outer diameter of the rolling elements 5, so that two approximately triangular receiving spaces A will be formed between the inner surface of the return passage 33 at both ends of the first axis D1 and each of the rolling elements 5, and the connecting portion 42 of the chain 4 is movably accommodated in the receiving spaces A.

Figure 3B:
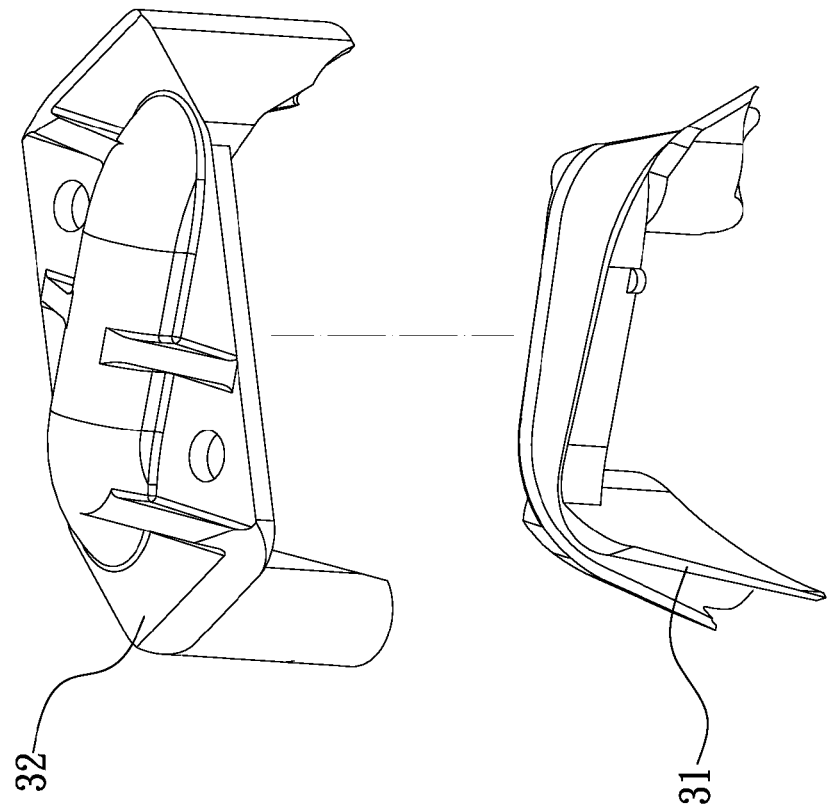
FIG. 3B is an exploded view of the return assembly in accordance with the present invention.
Figure 3A:
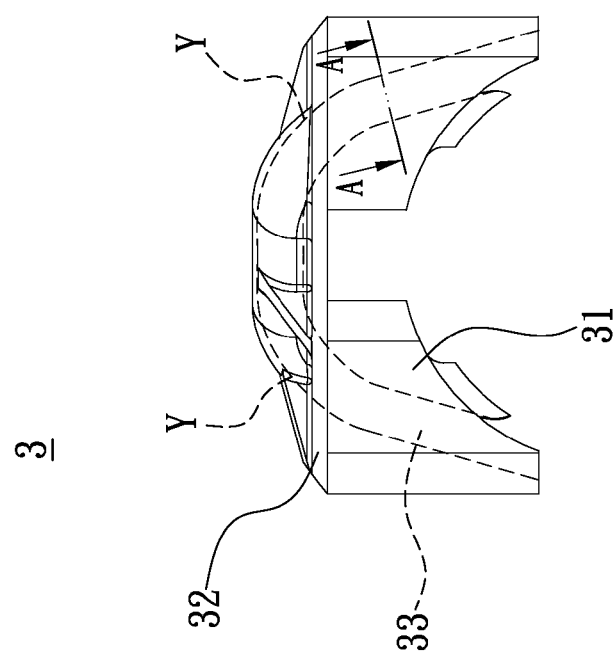
FIG. 3A is a side view of a return assembly in accordance with the present invention.
Figure 6:
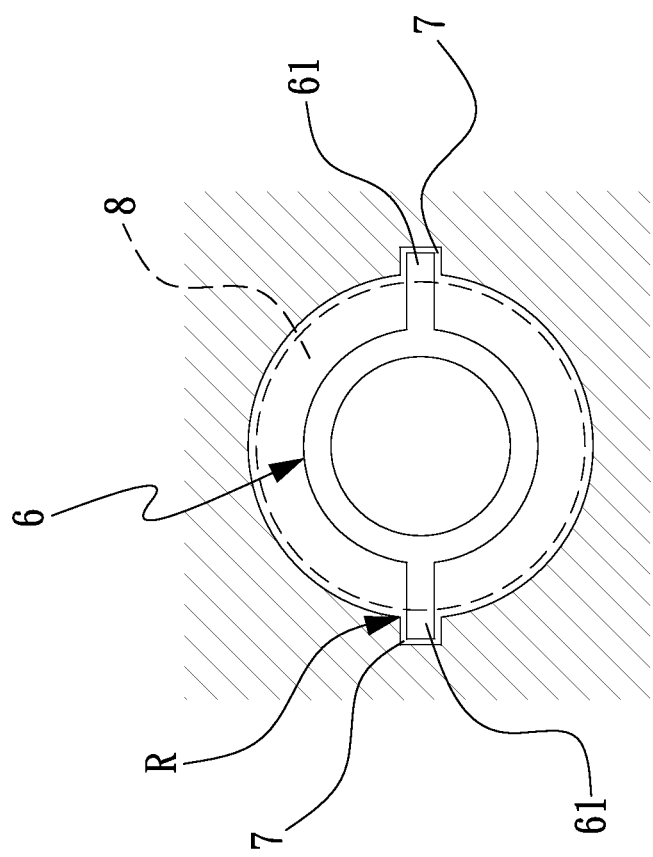
FIG. 6 is a cross sectional view showing the relationship between the return passage of a conventional return assembly and the chain.

Finally referring to FIGS. 1 and 3A, B, each of the return assemblies 3 comprises a first member 31 and a second member 32 which are assembled in an up-and-down manner (or each return assembly 3 in accordance with the present invention can also be provided with more than two members). The advantage of such an up-and-down arrangement is explained as follows: the rolling element 5 will impact a surface Y of the bent portion of the return passage 33 when moving to the bent portion of the return passage 33, and since the surface Y of the bent portion of the return passage 33 is an integral structure, it is capable of resisting relatively large forces (the conventional return assembly is assembled in a left to right manner, and there is a joint seam at the impact location, hence, the seam will be pushed open by the impact force, and the impact location is likely to break after a long time of use). Furthermore, with the fasteners G fixed in the direction as shown in FIG. 1, it can counteract the upward forces which are acted on the first members 31 and generated by impact of the rolling elements 5, so that the return assemblies 3 can be stably fixed on the nut.

While we have shown and described various embodiments in accordance with the present invention, it is clear to those skilled in the art that further embodiments may be made without departing from the scope of the present invention.

What is claimed is:
1. A ball screw, comprising:
a screw defined on its outer periphery with a helical groove;
a nut being inserted on the screw and defined with a helical groove which cooperates with the helical groove to form a load path;
at least one return assembly being disposed on the nut and defined with a return passage which is connected to the load path to form a circulation path;
a chain received in the circulation path and comprising a plurality of partition portions and a connecting portion for connecting the partition portions, a plurality of rolling elements being retained in the chain in such a manner that between each two neighboring partition portions is arranged a rolling element, each of the rolling elements being partially in contact with the return passage of each of the return assembly;
characterized in that:
a cross section of the return passage is a closed and complete elliptical shape and includes a first axis and a second axis which is shorter than the first axis, a central portion of the return passage is provided for passage of the rolling elements, an outer diameter of the rolling elements is equal to a length of the second axis, and a length of the first axis is larger than the outer diameter of the rolling elements, so that two semilunar receiving spaces will be formed between an inner surface of the return passage at both ends of the first axis and each of the rolling elements, and the connecting portion of the chain is movably accommodated in the receiving spaces.

2. The ball screw as claimed in claim 1, wherein the number of the receiving spaces is two.

3. The ball screw as claimed in claim 1, wherein a shape of a cross section of the return passage consists of a plurality of line segments which protrude outwards with respect to the rolling elements.

4. The ball screw as claimed in claim 1, wherein each of the return assemblies comprises more than two members.

5. A ball screw, comprising:
a screw defined on its outer periphery with a helical groove;
a nut being inserted on the screw and defined with a helical groove which cooperates with the helical groove to form a load path;
at least one return assembly being disposed on the nut and defined with a return passage which is connected to the load path to form a circulation path;
a chain received in the circulation path and comprising a plurality of partition portions and a connecting portion for connecting the partition portions, a plurality of rolling elements being retained in the chain in such a manner that between each two neighboring partition portions is arranged a rolling element, each of the rolling elements being partially in contact with the return passage of each of the return assembly;

characterized in that:

a cross section of the return passage is a closed and complete rectangular shape and includes four edges, a central portion of the return passage is provided for passage of the rolling elements, an outer diameter of the rolling elements is equal to a width between two opposed edges of the cross section of the return passage, and a diagonal distance of the rectangular cross section of the return passage is larger than the outer diameter of the rolling elements, so that two triangular receiving spaces will be formed between an inner surface of the return passage and each of the rolling elements, and the connecting portion of the chain is movably accommodated in the receiving spaces.

* * * * *